April 2, 1929. R. HOHNHORST ET AL 1,707,476
CLICK BOX
Filed July 17, 1925
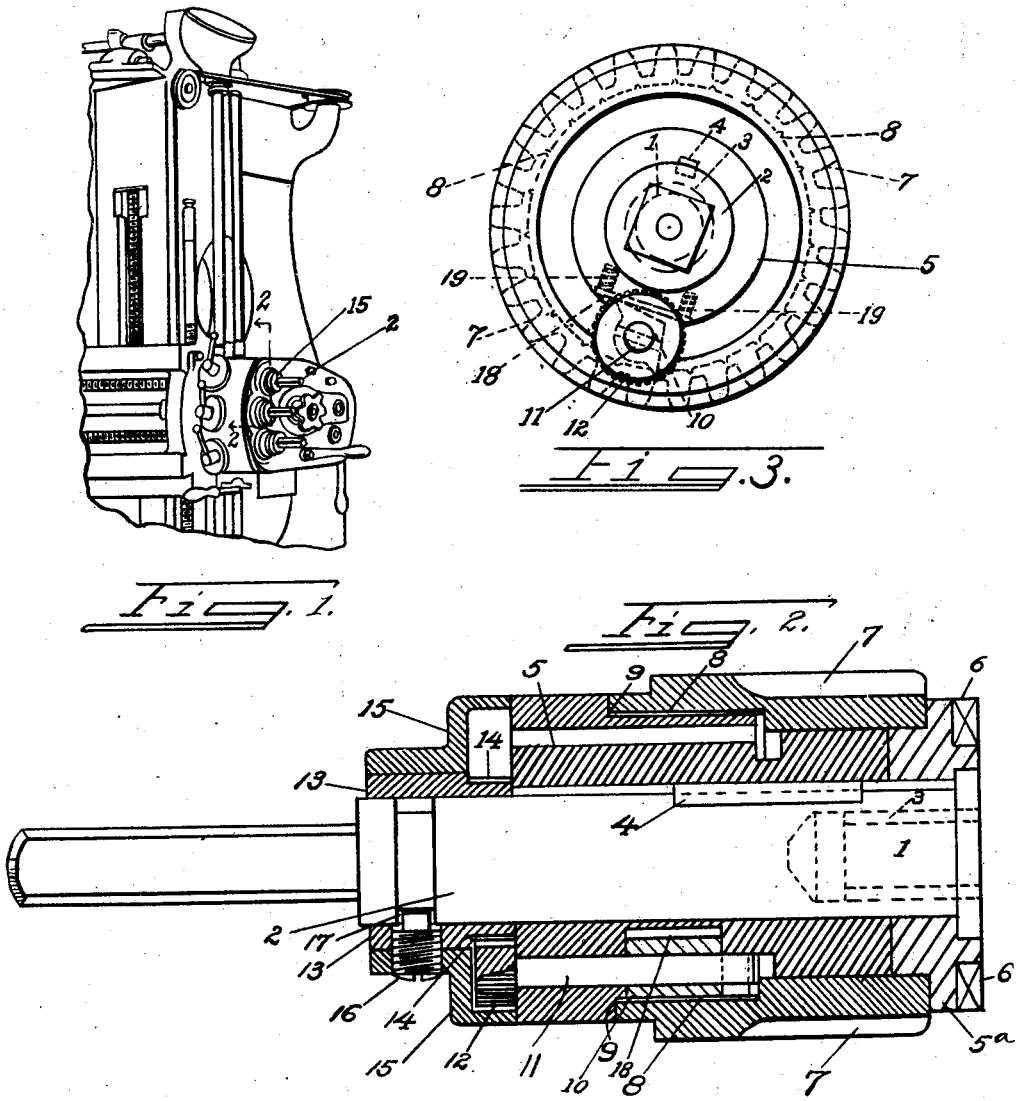
INVENTORS
Ralph Hohnhorst
George Langen
BY
ATTORNEYS.

Patented Apr. 2, 1929.

1,707,476

UNITED STATES PATENT OFFICE.

RALPH HOHNHORST AND GEORGE LANGEN, OF CINCINNATI, OHIO, ASSIGNORS TO THE CINCINNATI PLANER COMPANY, OF CINCINNATI, OHIO, A CORPORATION OF OHIO.

CLICK BOX.

Application filed July 17, 1925. Serial No. 44,256.

Our invention relates to click boxes in general and particularly to a novel click box adapted to control the movement of the pawl which regulates a clicker gear on a metal planer.

It is the object of our invention to provide a simplified and improved click box for metal planers which avoids the use of external pin posts and the danger to the operator incident thereto, and which embodies among other features a rotary cover cap for controlling the operation of the clicker pawl, which cap is connected to and encloses a pawl gear and pinion and provides a relatively wide range of movement of the part grasped by the operator as hereinafter set forth.

In the past, the control of the pawl element which operates the clicker gear has been usually accomplished by disposing pin posts on a housing enclosing the clicker gear. As two or more clicker gears have been required for the several motions imparted to the tool holders, there have often been two or more pin posts in close proximity to each other on the outer side of the housing. When an operator sought to adjust one of the pin posts he was likely to be in danger of having his fingers caught between two of the pins. It is primarily to avoid this likelihood that our invention is adapted. Further we have constructed a cap member with gearing permitting an increased movement of the cap over that which would be possible were the cap to be provided with internal teeth operating directly on a pinion positioned on the end of the pawl shaft.

Referring to the drawing in which we have illustrated a preferred structure of click box:

Figure 1 is a perspective view of a planer housing showing the usual position of the clicker gear box.

Figure 2 is a section through a clicker gear box as indicated by the line 2—2 in Figure 1.

Figure 3 is an end elevation of a clicker gear mechanism as it would appear if the cap member shown in Figure 2 and the external collar were removed.

The clicker box mechanism is mounted on a stud 1. A spindle 2 is mounted on the stud, the preferred mounting being provided by a bushing 3 in a recess in the spindle, enclosing the stud. A key 4 may be used to secure the spindle to a sleeve 5 which has a clutch mechanism 6 at the end toward the mounting stud. The clotch mechanism transmits the power for moving the cutting tool of the planer. The purpose of the clicker gear is to enable an operator to advance the cutting tool a certain distance for each alternate reciprocating stroke of the table. Suitable shaft and gear mechanism are provided in the well known way for moving a gear 7 rotatively mounted on the sleeve 5 and held in place by the thrust collar 5ª according to the movement of the table power element. The gear 7 therefore rotates first in one direction and then in the other, the number of turns depending on the gear ratio between it and the power element from which it is driven. Notches 8 in an annular groove 9 of the gear adjacent the sleeve are adapted to mesh with the corners of a triangular shaped spring pawl 10. The pawl is mounted on a shaft 11 extending out beyond the outer end of the sleeve and ending in a pinion 12. A collar 13 mounted on the spindle has gear teeth 14 which mesh with the pinion 12 and thus control the operation of the pawl. A cover cap 15, on the collar, is secured thereto by a set screw 16. The end of the set screw is extended to engage a groove 17 in the outer periphery of the spindle 2. This extended end is the only means by which the cover cap is held on the spindle and with the set screw removed both the cap and the collar may be removed from the spindle.

The turning of the cover cap, which may conveniently have a knurled surface, rotates the collar 13. The gear teeth 14 of the collar mesh with the pinion 12 which is on the pawl shaft. The pawl is adapted to be moved to three positions. In one position one corner of the pawl engages the inner notches 8 of the gear 7 and as the gear turns in, for example, a clockwise direction, the sleeve 5 is carried with it. When the gear turns in the reverse direction the corner of the pawl slips along the notches without engaging. On the next subsequent rotation of the gear 7 the pawl corner is again engaged in a notch as a flat plate 18 with springs 19 set in the sleeve bearing against the plate press against a flat side of the pawl and exert a tension to force the corner into the notch. By turning the pawl shaft in a counterclockwise direction the opposite corner of the pawl is set and spring-pressed to engagement position so that counterclockwise movement of the gear 7 will carry the sleeve 5 in a counterclockwise direction. When the pawl is in a central position the sleeve 5 will be entirely out of engagement with the gear 7.

From the foregoing description it becomes apparent that the construction of the gear 14 on the collar and the pinion 12 on the pawl shaft permits an increased movement of the cover over that which would be possible were the cover to be provided with internal teeth operating directly on a pinion positioned on the end of the pawl shaft. In other words, this would not be the case if the pinion 12 were directly in mesh with an internal gear on the periphery of the cap. The safety factor of the use of such a construction is obvious. Modifications of structure will occur to those skilled in the art without departing from the principle involved in our invention.

Having thus described our invention, what we claim as new and desire to secure by Letters Patent, is:—

1. In combination with a clicker gear, and a clicker gear pawl, a pawl shaft, a cover cap, a spindle extending through the clicker gear, a collar rotatably mounted on the spindle, said spindle having an annular grooved portion, means extending from the cover cap slidably engaging said annular grooved portion, said means connecting said cover cap and collar, said collar having an annular portion with gear teeth thereon, and said pawl shaft having a pinion mounted thereon with which said gear teeth engage.

2. In a click box, the combination with a spindle, of a clicker gear rotatable on the spindle, a collar rotatable on the spindle, a gear on the collar, a clicker gear pawl and pawl shaft, a pinion on the pawl shaft engaging the gear on the collar, a rotary cap mounted on the collar and enclosing said pinion and gear on the collar, and means rotatably connecting the cap and collar with the spindle.

3. In a click box, the combination with a spindle, of a sleeve fixed on the spindle, a clicker gear rotatable on the sleeve, a collar rotatable on the spindle, a gear on the collar, a clicker gear pawl and pawl shaft seated in the sleeve, a pinion on the pawl shaft engaging the gear on the collar, a rotary cap mounted on the collar and enclosing said pinion and gear on the collar, and means rotatably connecting the cap and collar with the spindle.

RALPH HOHNHORST.
GEORGE LANGEN.